UNITED STATES PATENT OFFICE.

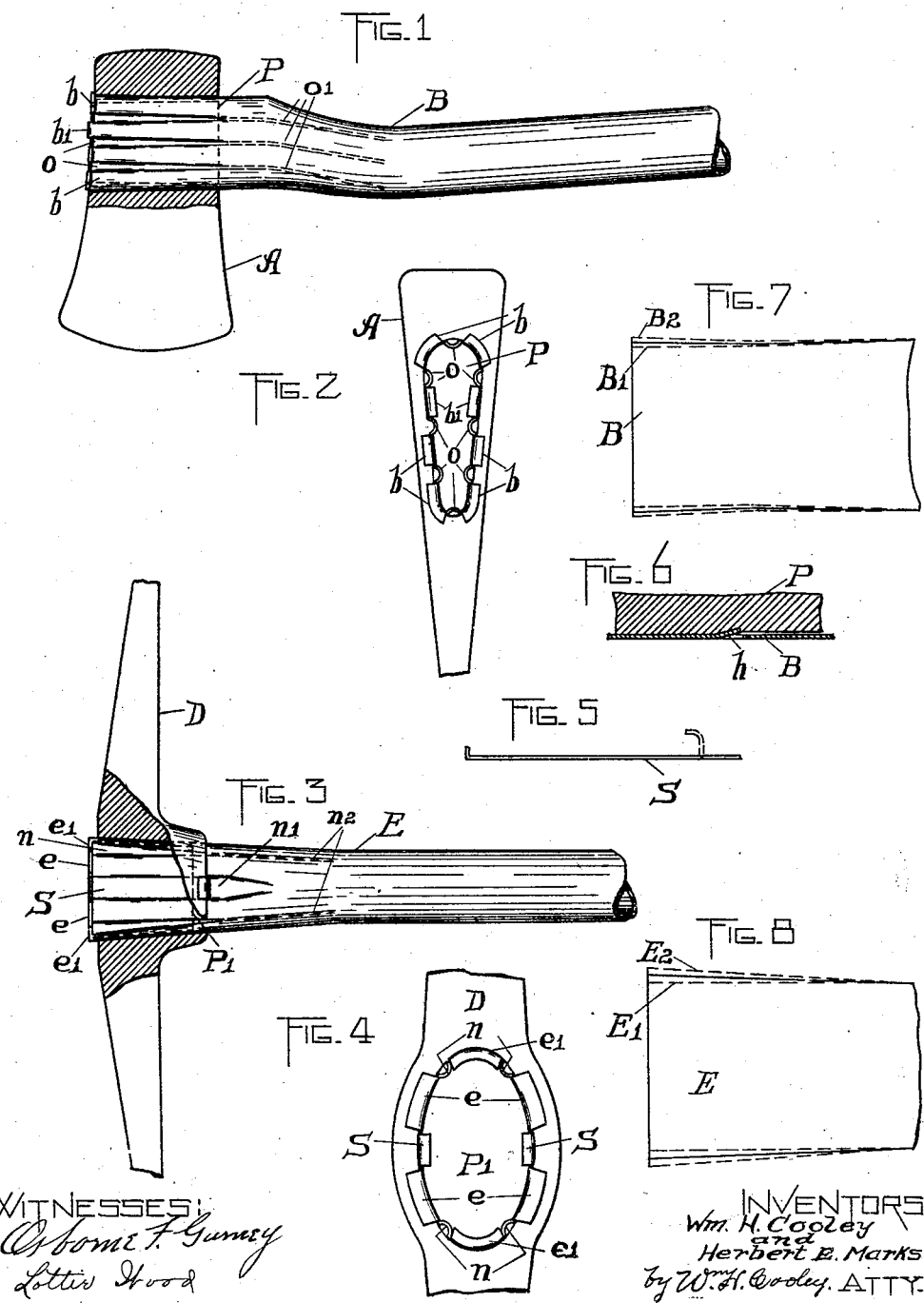

WILLIAM H. COOLEY, OF BROCKPORT, AND HERBERT E. MARKS, OF POUGHKEEPSIE, NEW YORK.

TUBULAR HANDLE FOR TOOLS.

No. 914,554.  Specification of Letters Patent.  Patented March 9, 1909.

Application filed June 27, 1907. Serial No. 381,064.

*To all whom it may concern:*

Be it known that we, WILLIAM H. COOLEY and HERBERT E. MARKS, citizens of the United States, and residents, respectively, of Brockport, Monroe county, and Poughkeepsie, Dutchess county, State of New York, have invented a new and Improved Tubular Handle for Tools, of which the following is a specification.

The object of our invention is to provide a tubular metallic handle readily adjustable to the eye of the tool in which it is to be secured in order that such handle may be kept in stock and readily adjusted by the purchaser to the slight differences in the sizes and shapes in the eyes of the tools in which they are to be secured, and further, to provide means for satisfactorily securing such handles in the eyes of the tools and that too without the use of threaded members for securing the parts together.

The accompanying drawings illustrating out invention are as follows:—

Figure 1 shows in side view a portion of a handle made and secured in an ax in accordance with our invention, the ax being shown partially in vertical section. Fig. 2 is an enlarged end view of the ax and handle as seen from the left. Fig. 3 is a view similar to Fig. 1 of a modified form of our handle as adapted to use with pick-axes, mattocks, etc. Fig. 4 is an enlarged view of the handle shown in Fig. 3 and a portion of the pick as seen from the left. Fig. 5 is an enlarged view of a retaining member adapted to use with the form of our handle shown in Figs. 3 and 4. Fig. 6 is a sectional view of part of the handle seen in Fig. 1 with the wedge therein and shows the means we make use of for holding the wedge in place. Figs. 7 and 8 show in full lines the general conformation of the eye in the tool to be fitted, seen in Figs. 1 and 3 respectively, while each of these figures shows in dotted lines in side view the general outline of that part of the handle both before and after being corrugated, adapting it to be fitted to the eye of the tool.

Similar letters refer to similar parts throughout the several views.

Referring to Figs. 1, 2, 6 and 7,—A is the ax shown partially in vertical section and within the eye of which is secured the handle B, of substantially the usual general conformation, formed up from a tube of sheet metal, the general contour of the left hand end of which before insertion in the eye of the tool is indicated in the inner dotted lines at $B^1$ in Fig. 7, while the contour of this end of the handle before being corrugated to give it the desired taper and conformation to make it readily insertible in the eye of the ax is indicated in Fig. 7 in the extreme outside lines at $B^2$. The tapered portion of the handle B is made of sufficient length to extend slightly through the eye of the ax and be formed down around the outer edge of the ax, as indicated in Figs. 1 and 2. The left hand end of the handle B is made tapering by the tapered corrugations $o$, as indicated, and between these corrugations the handle extends outwardly beyond the outer edge of the ax sufficiently to be formed down around at various points, as indicated at $b$ in Figs. 1 and 2, and between these downwardly turned portions the main body of the handle is cut out more or less to more readily permit and facilitate the bending over of these flaps or edges $b$. The handle is driven into the tool in very much the same way as the usual wooden handle, and when driven to place, the end of the handle between the flaps $b$ and $b^1$ may be cut or filed down to permit the flaps $b$ to be readily bent or formed over the outer edge of the ax and flaps $b^1$ over the wedge. Before bending these flaps $b$ and $b^1$ down, however, it is desirable that the corrugations be flattened out sufficiently to force the outer end of the handle against the inner surface of the eye at the outer edge of the ax in order that the handle may firmly engage the eye of the ax at all points, and such engagement may be maintained by the use of the wedge P, as indicated in dotted lines in Fig. 1. This wedge P may also be held in place within the handle by forming engaging tongues $h$, opening or extending inwardly toward the right, as indicated in Fig. 6. These tongues $h$ may be forced outwardly during the act of inserting the wedge, but having sharp points they engage into the outer surface of the wedge P in such a way as to oppose the withdrawal of the wedge outwardly to the left and from the handle. After the depressed portions of the handle between the corrugations $o$ have been flattened out sufficiently to force the handle firmly against the wall of the eye, then the wedge may be inserted and driven home to place and the end flaps or projections $b$ may be turned outwardly and down against the outer end of the ax, helping to retain the same in proper position upon the handle.

Refer now to Figs. 3, 4, 5 and 8,—The modification of our handle therein shown is adapted to use in picks, etc. and in which the eye in the tool for the handle tapers from the outer face inwardly. This style of handle is adapted to use with those tools from which it is desirable to remove the handle for the purpose of sharpening or storing the tool. It will be seen that the corrugations $n$ in the end of the handle are very similar to those $o$ already described with reference to the other form of our handle and that they are more or less obliterated or flattened out to cause the handle to conform closely to the eye of the tool and that in this case there are provided not only flaps $e$ similar in arrangement and operation to the flaps $b$ already described with reference to the other form of my handle, but additional to such flaps $e$ there are provided flaps as $e^1$, which may be bent inwardly and when thus bent operate to more firmly hold the handle in its normal contour after being inserted and secured. There may be any desired relation between the number of the flaps bent as at $e$ and at $e^1$, as shown in Figs. 3 and 4. Additional to the flaps $e$ and $e^1$ there are seen retaining clips S adapted to lie between the eye of the tool and the outside of the handle and in the depressions between the corrugation $n^1$ in the handle and such clips S are bent over inwardly and around the outer end of the handle, as seen in Figs. 3 and 4, and their inner ends are bent around and over the inner edge of the eye of the tool, operating to prevent the tool from slipping upwardly on the handle. Of the clips S there may be any desired number. With this form of our handle there may be used a wedge as $P^1$ when desired.

The operation and method of inserting and securing our handle is believed to be sufficiently obvious from the above description to call for no further mention herein.

For the purpose of strengthening and stiffening the handle within the tool and to absorb or reduce the shock to the hand of the person using the tool, we have sometimes found it desirable to extend the corrugations upwardly on the handle, as indicated at $o^1$ and $n^2$ in Figs. 1 and 3 respectively.

What we claim is:—

1. A tubular handle for tools having the portion thereof engaging within the eye of the tool corrugated longitudinally of the handle.

2. A tubular handle for tools having the portion thereof engaging within the eye of the tool corrugated, such corrugations being tapered to taper the corrugated portion of the handle.

3. A tubular handle for tools having the portion thereof engaging within the eye of the tool corrugated, the corrugated portion of such handle tapered and such corrugations tapered.

4. A tubular handle for tools having the part thereof adapted to engage within the eye of the tool tapered and corrugated and such corrugations straightened out more or less after the insertion of the handle in the tool to expand the handle outwardly against the wall of the eye of the tool.

5. A tubular handle for tools having a tapered portion formed to fit the taper in the eye of the tool; a wedge within the outer end of the handle adapted to force the handle outwardly against the wall of the eye or socket in the tool and inwardly formed depressions in such handle having engaging points extending inwardly and rearwardly adapted to engage the wedge and prevent its withdrawal.

6. As a means for fitting a tubular handle to the eye of a tool; corrugations in such handle extending longitudinally thereof adapted when more or less straightened out to force the wall of the handle outwardly against the inside of the eye of the tool.

7. A tool having an eye tapering outwardly each way from a point between the ends of the eye and means for holding the handle within the eye of the tool comprising corrugations in the portion of the handle adapted to engage within the eye of the tool, such portion of the handle tapered and adapted to be forced into the eye of the tool to approximately fit the taper at the inner end of the eye and the corrugations in the end of the handle more or less straightened out to cause the wall of the handle to conform to the taper of the eye at the outer end thereof.

8. A tubular handle for tools having a tapered portion formed to fit the taper in the eye of the tool; a wedge within the outer end of the handle adapted to force the handle outwardly against the wall of the eye in the tool and flaps on the outer end of the handle turned down upon the wedge to hold it in place.

9. A tubular handle for tools having the portion thereof engaging within the eye of the tool corrugated longitudinally of the handle, such corrugations tapered to taper the corrugated portion of the handle.

10. A tubular handle for tools having the portion thereof engaging within the eye of the tool corrugated longitudinally of the handle, the corrugated portion of such handle tapered and such corrugations tapered.

11. A tubular handle for tools having the part thereof adapted to engage within the eye of the tool tapered and corrugated longitudinally of the handle and such corrugations straightened out more or less after the insertion of the handle in the tool to expand the handle outwardly against the wall of the eye of the tool.

WM. H. COOLEY.
HERBERT E. MARKS.

Witnesses:
OSBORNE F. GURNEY,
LOTTIE WOOD.